United States Patent [19]

Gleim et al.

[11] Patent Number: 5,235,173
[45] Date of Patent: Aug. 10, 1993

[54] PROCESS FOR POSITIONING A LIGHT BEAM ON A PICTURE AREA

[75] Inventors: Günter Gleim, Villingen; Jacques Chauvin, Mönchweiler, both of Fed. Rep. of Germany

[73] Assignee: Deutsche Thomson-Brandt GmbH, Villingen, Fed. Rep. of Germany

[21] Appl. No.: 882,142

[22] Filed: May 13, 1992

Related U.S. Application Data

[63] Continuation of PCT/EP/90/01674, filed Oct. 5, 1990.

[30] Foreign Application Priority Data

Oct. 13, 1989 [DE] Fed. Rep. of Germany ....... 3934229

[51] Int. Cl.$^5$ .............................................. G01J 40/14
[52] U.S. Cl. .............................. 250/206.1; 250/214 B; 358/237
[58] Field of Search .............. 250/206.1, 206.2, 214 B; 356/121, 141, 152; 358/10, 237

[56] References Cited

U.S. PATENT DOCUMENTS

| | | | |
|---|---|---|---|
| 4,085,425 | 4/1978 | Hemill | 358/237 |
| 4,593,308 | 6/1986 | Kemplin | 358/10 |
| 4,629,877 | 11/1986 | Sato et al. | 250/214 B |
| 4,851,689 | 7/1989 | Hasegawa | 250/214 B |

FOREIGN PATENT DOCUMENTS 0280302  2/1988  European Pat. Off. .
3311971  10/1984  Fed. Rep. of Germany .

OTHER PUBLICATIONS

Patent Abstracts of Japan 62-104295 May 14, 1987.
Patent Abstracts of Japan 62-334551.

Primary Examiner—David C. Nelms
Assistant Examiner—K. Shami
Attorney, Agent, or Firm—Joseph S. Tripoli; Joseph J. Laks; Daniel E. Sragow

[57] ABSTRACT

A method of positioning a light beam on a picture surface relative to a light sensor located on the picture surface includes the step of completely illuminating the sensor with the light beam while the sensor is exposed to ambient light and recording a first output signal. A second output signal is recorded when the sensor is exposed to only ambient light. The first and second output signals are provided to an evaluation circuit to calculate a positioning signal having a value equal to a selected percentage of the difference between the first and second output signals. The light beam is positioned relative to the sensor to expose the sensor to a percentage of the light beam which is equal to the selected percentage of the difference between the first and second signals 7 Claims, 1 Drawing Sheet

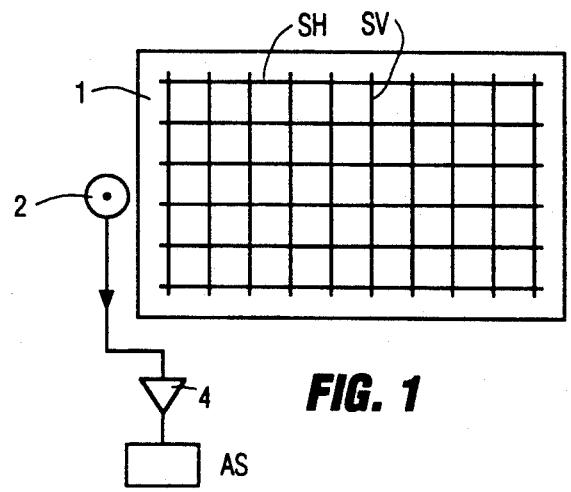
FIG. 1
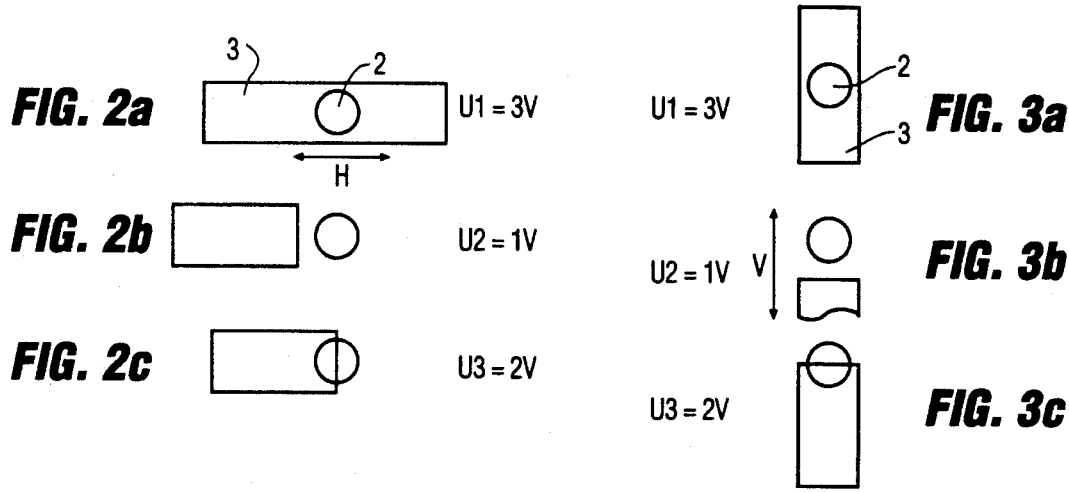
FIG. 2a  FIG. 3a
FIG. 2b  FIG. 3b
FIG. 2c  FIG. 3c
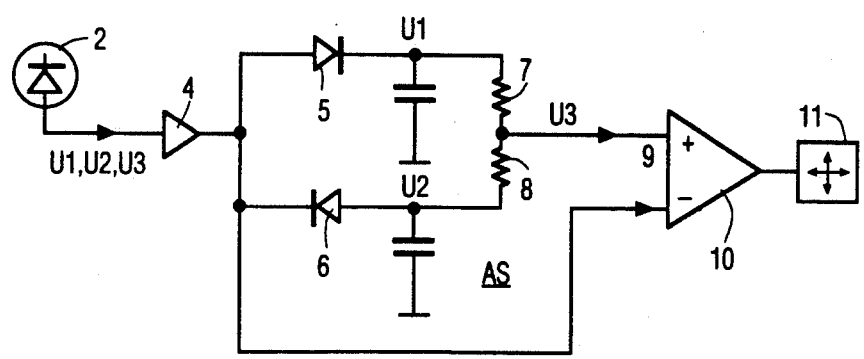
FIG. 4

PROCESS FOR POSITIONING A LIGHT BEAM ON A PICTURE AREA

This is a continuation of PCT Application PCT/EP 90/01674, filed Oct. 5, 1990, by Gunter Gleim and Jacques Chauvin and titled, "PROCESS FOR POSITIONING A LIGHT BEAM ON A PICTURE AREA".

The invention is directed generally to a method for positioning a light beam on a picture area, and particularly to such a method used with color projection TV's.

In projection television devices, monochrome pictures are generated by three separate picture tubes for red, green and blue (R,G & B) and are congruently projected onto a reflective surface to present a color picture. This requires that the three differently colored pictures be precisely located at a particular position of the reflective surface. Such exact positioning is required, for example, for adjusting the convergence and other deflection parameters. Typically, the positioning is effected by producing a grid pattern composed of horizontal and vertical bright lines on the reflective surface. The position of the grid pattern on the reflective picture surface must be precise. The measurement of the position of a light beam on the reflective surface can also be used to evaluate the deflection amplitude in the horizontal and vertical directions, to readjust or to stabilize the deflection or to adjust the deflection to particular selected values. Accordingly, the precise position of the light beam in relation to a sensor must be determined. The actual output signal of the sensor, however, is dependent upon the intensity of the light beam and also upon the level of ambient light to which the sensor is also unavoidably exposed.

The invention is directed to a method and circuit for accurately positioning a light beam on a picture surface independently of the intensity of ambient light illuminating the sensor. With the invention, two test measurements are taken to determine the output signals of the sensor when the sensor is fully illuminated by the light beam and when the sensor is not illuminated by the light beam. Because both test measurements include the effects of ambient light illuminating the sensor, the influence of the ambient light on the test results can be evaluated and eliminated. The output signals of the sensor when the sensor is fully exposed by the light beam and completely unexposed by the light beam are known and, therefore the output signal of the sensor when the sensor is partially illuminated by the beam, is a measure of the position of the light beam with respect to the sensor. For example, when the relative positioning of the sensor and light beam is such that the output signal of the sensor is equal to the mean value between the sensor output signals, when the sensor is fully illuminated and completely unilluminated, the light beam covers half the sensor, and one position of the light beam with respect to the sensor is defined.

It can be advantageous to modulate the light beam in accordance with a known mode of modulation, for example amplitude, during the test measurements and during the subsequent position measurements of the light beam. The evaluation circuit then also includes a selection circuit section which responds to the modulation. The sensitivity of the evaluation circuit to ambient light and other disturbances is thus reduced, because the ambient light and disturbances are not modulated.

In the figures:

FIG. 1 shows a picture surface with a grid design and a sensor in principle,

FIGS. 2a-2c and 3a-3c show successive phases of illumination in the exposure of the sensor horizontally and vertically, respectively, and FIG. 4 is a preferred embodiment of an evaluation circuit which evaluates the output signals of the sensor.

FIG. 1 shows a picture surface 1 of a television projection device on which a grid composed of horizontal bright lines SH and vertical bright lines SV is displayed by means of three separate picture tubes for R, G, B. The grid is used to assess and correct the convergence and to determine the convergence correction values, which are stored in a known manner, for the respective crossing point of the grid design. A light sensor 2 is located in the proximity of the picture surface, either within or outside the picture area, and is used for an exact positioning of the lattice design in relation to the picture screen 1. The sensor 2 can consist of several sensors or sensor elements and is used to determine the positioning of information displayed on the screen in both the horizontal and vertical directions. The output signal of the sensor 2 is fed via an amplifier 4 to an evaluation circuit AS.

FIGS. 2 and 3 show the illumination of the sensor 2 by the light beam 3 in the horizontal direction H and the vertical direction V, respectively. In FIGS. 2a and 3a, the light beam 3 is positioned on the picture surface such that the sensor 2 is completely illuminated by the light beam 3. The sensor 2 thus supplies an output signal $U1 = 3$ V which is representative of illumination provided by both the light beam 3 and ambient light. In FIGS. 2b and 3b, the light beam 3 is either switched off or physically positioned so that the sensor 2 is not illuminated by the light beam 3 and thus is illuminated only by ambient light. Accordingly, the output signal of the sensor 2 is $U2 = 1$ V and is attributed only to the ambient light.

The mean value $U3 = 2$ V of the output signal U1 for the fully illuminated sensor and the output signal U2 for unilluminated sensor is provided by a control circuit AS. The control circuit shifts the light beam in the horizontal direction H or the vertical direction V such that the output signal of the sensor has the value of $U3 = 2$ V. The presence of output signal U3 assures that the light beam 3 illuminates one half of the sensor 2. Thus, a precisely defined position of the beam 3, relative to the sensor 2, is indicated. The signal U3 need not be the exact mean value of U1 and U2. The signal U3 can also represent another value between U1 and U2, for example, 1.5 or 2.5 volts. The value U3 than corresponds to a different percentage of illumination of the sensor 2.

In FIG. 4, the sensor 2 successively supplies the output signals U1, U2, U3, via the amplifier 4, to two rectifier circuits 5, 6 within the control circuit AS. The rectifier circuit 5 supplies the illuminated value U1, and the rectifier circuit 6 supplies the unilluminated value U2. The control circuit AS also simultaneously serves as a holding circuit, and the signals U1 and U2, which appear successive in time as input signals, are available simultaneously as an output signal. Thus, signals U1 and U2 are added, via the resistors 7, 8, and the voltage U3 is applied to the input terminal 9 of the differential amplifier 10, when the two resistors 7 and 8 are equal, $U3 = (U1 + U2)/2$, when a percentage illumination other than 50% is desired, the resistors 7 and 8 are ratioed in accordance with the desired percentage.

The voltage U3 serves as the input signal to the plus terminal of a differential amplifier 10, to indicated the percentage of the sensor 2 which is illuminated by the light beam 3. The output voltage of the amplifier 10 controls a means 11 which shifts the position of the light beam 3 in the horizontal direction H and the vertical direction V on the screen 1.

The circuit shown in FIG. 4 is controlled by a processor to perform the above steps. Thus, the value of U1 is first determined, and the value for U2 is determined second. The value of U3 used to bring the light beam 3 and the sensor 2 to the desired relative positions is determined last.

The above description, make with reference to FIGS. 1 through 4, is directed to monochrome a light beam 3. The light beam can also be a plurality of different colored light beams. The individual colors of the multiple colored beam originate from, for example, three picture tubes for the basic colors, Red, Green and Blue, each of which generates a monochrome picture on the picture surface 1. The three monochrome pictures overlay one another on the picture surface 1 and produce a color picture, and a white display is produced when the three colors are simultaneously displayed in the proper proportions. This is similar to producing white in a three-beam color picture tube.

What is claimed is:

1. A method of positioning a light beam on a picture surface relative to a light sensor located on said picture surface comprising the steps of:
   a) completely illuminating said sensor with said light beam while said sensor is exposed to ambient light and recording a first output signal;
   b) recording a second output signal when said sensor is exposed to only ambient light;
   c) providing said first and second output signals to an evaluation circuit to calculate a positioning signal having a value equal to a selected percentage of the difference between said first and second output signals; and
   d) positioning said light beam in position relative to said sensor to expose said sensor to a percentage of said light beam which is equal to said selected percentage.

2. The method of claim 1 wherein the value of said positioning signal is the mean value of said first and second signals;

3. The method of claim 2 further including the step of storing and rectifying said first and second output signals and simultaneously applying the rectified signals to means for positioning said light beam.

4. The method of claim 3 further including the step of modulating said light beam to distinguish said light beam from ambient light.

5. The method of claim 4 wherein said light beam is composed of a plurality of several different color light beams.

6. The method of claim 1 further including the step of modulating said light beam to distinguish said light beam from ambient light.

7. The method of claim 6 wherein said light beam is composed of a plurality of several different color light beams.

* * * * *